(12) United States Patent
Keller et al.

(10) Patent No.: US 7,209,592 B2
(45) Date of Patent: Apr. 24, 2007

(54) IMAGE STORAGE AND DISPLAY SYSTEM

(75) Inventors: Scott Keller, Mount Prospect, IL (US); Kaushal Shastri, Stamford, CT (US); Renee Walsh, Wilton, CT (US)

(73) Assignees: Fuji Film Corp., Tokyo (JP); Fuji Film Medical Systems USA, Stamford, CT (US)

( * ) Notice: Subject to any disclaimer, the term of this patent is extended or adjusted under 35 U.S.C. 154(b) by 1141 days.

(21) Appl. No.: 09/774,885

(22) Filed: Feb. 1, 2001

(65) Prior Publication Data

US 2002/0102028 A1 Aug. 1, 2002

(51) Int. Cl.
*G06K 9/36* (2006.01)
(52) U.S. Cl. .................... 382/240; 382/232; 382/239
(58) Field of Classification Search ........... 382/232, 382/233, 239, 240, 244, 245, 251, 305, 166, 382/132; 707/101, 104.1; 709/219, 328; 358/296, 403, 1.6, 1.9, 1.17; 385/117; 248/231.1
See application file for complete search history.

(56) References Cited

U.S. PATENT DOCUMENTS

| | | | | |
|---|---|---|---|---|
| 5,267,333 A | * | 11/1993 | Aono et al. | 382/166 |
| 5,361,203 A | * | 11/1994 | Hiyama et al. | 385/117 |
| 5,502,778 A | * | 3/1996 | Ishikawa et al. | 382/239 |
| 5,713,022 A | | 1/1998 | Yamashita | 707/104.1 |
| 5,870,534 A | * | 2/1999 | Tsuchitoi | 358/1.16 |
| 5,923,828 A | * | 7/1999 | Yagishita | 358/1.17 |
| 6,006,231 A | * | 12/1999 | Popa | 707/101 |
| 6,014,671 A | | 1/2000 | Castelli et al. | 704/207 |
| 6,137,914 A | | 10/2000 | Ligtenberg et al. | 382/240 |
| 6,269,379 B1 | * | 7/2001 | Hiyama et al. | 707/104.1 |
| 6,690,417 B1 | * | 2/2004 | Yoshida et al. | 348/231.1 |
| 6,731,400 B1 | * | 5/2004 | Nakamura et al. | 358/1.9 |
| 6,748,099 B1 | * | 6/2004 | Kawata | 382/132 |
| 6,856,414 B1 | | 2/2005 | Haneda et al. | 358/1.15 |

FOREIGN PATENT DOCUMENTS

| | | |
|---|---|---|
| EP | 0 982 668 A2 | 3/2000 |
| JP | 403188570 A * | 8/1991 |
| JP | 405046716 A * | 2/1993 |
| JP | 08-077332 | 3/1996 |
| JP | 09-259250 | 10/1997 |
| JP | 2000-268164 | 9/2000 |

* cited by examiner

*Primary Examiner*—Anh Hong Do
(74) *Attorney, Agent, or Firm*—Sughrue Mion, PLLC

(57) ABSTRACT

An image storage and display system transmits required image data such as original image data and irreversible compressed image data expediently. Original image data input to the image server from the input modality is subjected to a data compression process by the server computer ad irreversible compressed image data having a decompression ratio of 1/20, 1/50, etc. is thereby produced. In this way, three versions of image data, original image data, and two irreversible compressed image data having different compression ratios are created for a single image and stored in a temporary storage medium. A request is issued from a workstation, connected to the image server via a network, for transmission of the version of image data to be acquired, and the requested image data is read out from the temporary storage medium, transmitted to the workstation and displayed on a monitor.

20 Claims, 6 Drawing Sheets

FIG.3

| STATUS | V 1 | V 2 | V 3 |
|---|---|---|---|
| 1 | ○ | | |
| 2 | ○ | ○ | ○ |
| 3 | ○ | ○ | ○ |
| 4 | ○ | ○ | ○ |
| 5 | ○ | ○ | ○ |

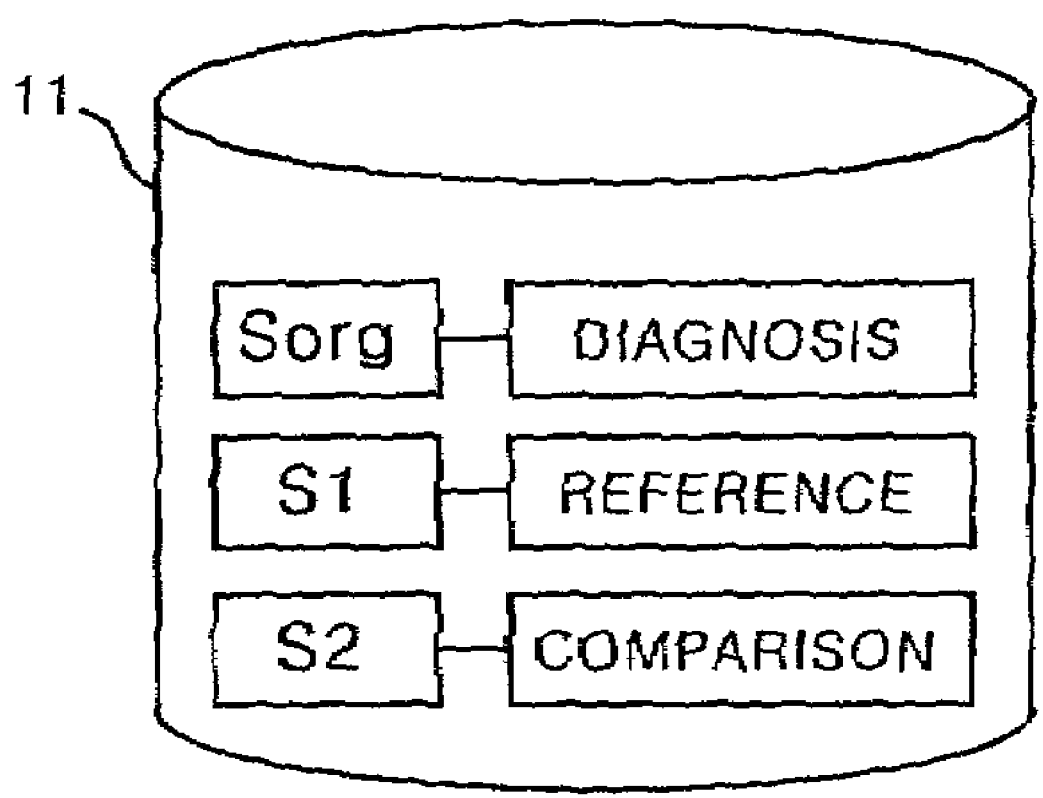

IMAGE STORAGE AND DISPLAY SYSTEM

BACKGROUND OF THE INVENTION

1. Field of the Invention

The present invention relates to an image storage and display system, and more particularly to an image storage and display system having a workstation and an image server storing a plurality of medical image data connected via a network, for use in a medical network.

2. Description of the Related Art

There are in use in the medical field today apparatus (modalities) for forming X-ray and other diagnostic images used in a variety of diagnosis, including CR (computed Radiography) apparatus, CT (Computerized Tomography) apparatus, MRI (Medical Resonance Imagery) apparatus, etc. The image data produced in each modality is displayed on a CRT terminal (hereinafter referred to simply as a CRT), or output by a laser printer, etc. to film, etc. for use by a reader at a medical treatment site in ascertaining the presence or absence of a disease, tissue damage, etc.

In addition, recent advances in computer and communications technology have seen the deployment of medical network systems (hereinafter referred to simply as networks) in hospitals and other facilities. Therefore, whereas in the past the aforementioned modalities were used only on a stand-alone basis, now they are connected to a network as image input apparatus, and CRTs, laser printers, etc., as image output apparatus.

Aside from aforementioned image input and output apparatus, also connected to such a network is an image server equipped with recording means for recording image data output by the image output devices, as it is, or after it has been subjected to a predetermined data-compression process, to a storage medium such as a hard disk, a RAID (Random Array of Inexpensive Disks), an optical disk: CD-R, DVD, DLT (Digital Linear Tape); etc. Image data input to such an image server is temporarily recorded on a high output-speed temporary storage medium (referred to as a short-term storage medium) such as a hard disk or a RAID, and after the set conditions have been satisfied (such as the passage of a predetermined period of several weeks to several months after a doctor has completed diagnosis employing an image), the image data is compressed and recorded on a storage medium such as an optical disk, etc. (archive), for semi-permanent storage. This is because the price of the temporary storage medium is comparatively high, and therefore high costs are incurred in expanding the storage capacity thereof. Furthermore, data management of image data thus stored in the image server, such as transferring image data from a temporary storage medium to an archive, etc. is conducted by a database.

In such a network, predetermined image data is transmitted from the image server to a workstation connected to the network in response to a request from the workstation. In this way, it is possible to display at the workstation image data required for diagnosis. Further, because image data obtained by aforementioned input modalities is stored in a short-term storage medium before aforementioned set conditions are satisfied, it can be read out at a comparatively high speed; therefore, if there is a request from the workstation, the image data can be expeditiously transmitted to the workstation. In addition, not only the internal network of a hospital, but also a computer at a doctors residence, for example, can be connected via a communications circuit such as a telephone line to enable image data to be read out from the image server in order to carry out so-called remote diagnosis (teleradiology). However, compared to the dedicated lines composing the internal hospital network, data transmitted over aforementioned communications circuits is transmitted at a slower rate, and therefore the time required for downloading image data is longer. In order to improve transmission efficiency of diagnostic images to be utilized for remote diagnosis, it is proposed to provide for transmission of image data that has been determined in advance to be the desired image data and which has been subjected to a comparatively high-rate data-compression process, and to provide notification upon completion of transmission, using the so-called push-style.

On the one hand, as a type of diagnosis, images obtained in the present are compared to images obtained in the past in a comparative diagnosis. When such comparative diagnosis is performed, it is necessary to acquire the past image data from the image server. Because image data stored in the short-term storage medium is transferred in the long-term storage medium after the set conditions have been satisfied, to acquire the past image data it is necessary to search for the past image data in the long-term storage medium, copy it to the short-term image medium and then transmit it to the workstation.

On the other hand, the so-called pre-fetch procedure in which the past image data is copied to the short-term storage medium in advance, according to an examination schedule, etc., is performed. However, for emergency cases, etc., if there is a request for past image data that is not in the schedule, in the same way described above, the past image data must be acquired by searching for it in the long-term storage medium, copying it to the short-term image medium and then transmitting it to the workstation.

Accordingly, it takes time for the past image data to be displayed at the workstation.

In addition, because aforementioned past image data is subjected to a comparatively high-rate data compression process, it is degraded in image quality compared to the original image data. However, high image-quality past image data is desired for use in carrying out comparative diagnosis. However, because the original image data is deleted after aforementioned set conditions have been satisfied, it has not been possible to view high image-quality images obtained in the past.

Further, for cases in which remote diagnosis is to be performed, because the communications circuit over which image data is transmitted has a low data-transmission rate, it is preferable that the compression ratio of such image data is high. However, only past image data is compressed at a high compression rate and stored, and when remote diagnosis is to be performed, the image data obtained in the present must be subjected to a data-compression process and then transmitted; therefore, long transmission times are required.

SUMMARY OF THE INVENTION

The present invention has been developed in consideration of the circumstances described above. A main objective of the present invention is to provide an image storage and display system that transmits required image data expediently.

The image storage and display system of the present invention comprises an image server having a high readout-speed capable storage medium for recording and storing image data, and a display terminal connected to the server via a network.

The image server is provided with a storage control means for creating from the original image data at least one irreversible compressed image data having multiple versions of image data, and storing in the high readout-speed capable storage medium the original image data, reversible compressed image data created from the original image data, and said created irreversible compressed image data.

The display terminal is provided with an input means capable of receiving specification of image data or image data groups to be displayed on said image terminal, and acquisition means for acquiring the image data and data groups specified in said input means.

The expression "high readout-speed capable temporary storage medium" refers to a hard disk, a RAID, or the like storage medium capable of comparatively high-speed readout of image data.

The "storage control means" is installed in the image server of the medical network described above. More specifically, a server computer, etc. can be employed as said storage control means for creation of aforementioned multiple versions of image data, transmission image data, storage, management, etc.

The "display terminal" corresponds to a workstation connected to the image sever in said medical network. More specifically, it comprises an CRT, LCD, etc. monitor for rendering image data as a visible image, and a computer for controlling the displaying of images and various other operations and processes. Note that as "input means", a mouse, keyboard, etc. can be employed for performing various input operations, and a computer can be employed as the "acquisition means".

The expression "at least one irreversible compressed image data" refers to the irreversible compressed image data obtained by subjecting original image data to a data-compression process, which has a high compression ratio compared to reversible compressed image data. Note that in the present invention it is possible to create more than one irreversible compressed image data, however, in such cases, each irreversible compressed image data has a different compression ratio.

In the present invention, at least one irreversible compressed image data is created (there are also cases in which reversible compressed image data of original image data is created), however, if the compression ratio and compression type (reversible, not compressed, etc.) of each image data is different, the image quality of images reproduced is different. That is to say, the higher the compression ratio the higher the degradation in image quality; irreversible compressed image data is inferior in image quality to reversible compressed image data. On the one hand, the higher the compression ratio of undecompressibly compressed image data, the lower the volume of said image data, and the transmission time can be thereby reduced. Accordingly, in the present invention, the compression ratios and compression types are different, and the image data having different compression ratios and compression types are each defined as a different "version" of image data. Therefore, the expression "multiple versions of image data" refers to the image data each having a different compression ratio, compression type, image quality with respect to images reproduced thereof, and volume.

Here, depending on the type of input modality, the part being examined, the examination method, the image size, etc., there are images for which, even if compressed to a high compression ratio, the degradation in image quality is not strikingly noticeable. Therefore, in order to compress image data at as a compression rate possible, it is advantageous to change the compression ratio of irreversible compressed image data, based on the modality by which image data was obtained, the part being examined, or the examination method. Note that for such cases, it is possible to change the compression ratio of the images for each examination or series within an examination. Here, the word "series" refers to the different types of examinations within a single examination. More specifically, for an examination in which images have been obtained by a CT apparatus, the series represents the CT images including, "head CT image", "chest CT image", etc.

Note that normally a plurality of image data is created for a single examination or series and stored in the image server, and there are cases in which a plurality of image data for each examination or series is acquired at the display terminal; however, the same version of each image data is obtained. In the present invention, "image data group" refers to the acquiring, at the display terminal, of the same version of a plurality of image data assembled in this way according to an examination or series.

In addition, the expression "image data and image data groups are acquired" means that image data and image data groups are made capable of being displayed at the display terminal. More specifically, by image data and data groups being transmitted from the image server to the display terminal, new image data and data groups can be acquired at the display terminal. Additionally, by the display terminal reading out image data and data groups stored in a storage medium, image data and data groups can be acquired thereon. Note that image data and data groups acquired at the display terminal can be stored in a storage medium thereof (a temporary buffer memory, a hard disk, etc.).

Further, in the image storage and display system of the present invention: that the input means is capable of receiving specification of aforementioned versions as the image quality and/or usage purpose represented by the image data of each version; that the storage control means assigns to the image data of each version one or more parameters representing the image quality and/or usage purpose thereof, and records said versions on aforementioned storage medium; and that the acquisition means acquires the version of image data corresponding to the desired image quality and/or usage purpose received in the input means is advantageous.

The expression "a parameter representing image quality" refers to the image quality of the images represented by the image data of each version, according to the compression ratio and compression type. For example, parameters of the sort indicating that images represented by original image data or reversible compressed image data have image quality of 100%, images represented by irreversible compressed image data having a compression ratio of 1/20 have image quality of 70%, images represented by irreversible compressed image data having a compression ratio of 1/50 have image quality of 30%, expressed in relation to the image quality of 100% for original image data, can be used as image quality parameters. Note that in detail, the relation between image quality and compression ratio varies depending on the type of input modality. For example, the compression ratio at which image quality of 50% compared to original image data is attained is: 1/20 for a CR apparatus; 1/10 for a CT apparatus; and 1/5 for an MRI apparatus. In addition, a decompression ratio producing 25% image quality compared to original image data is: 1/50 for a CR apparatus; 1/20 for a CT apparatus; and 1/10 for an MRI apparatus.

The expression "a parameter representing usage purpose" refers to the parameter representing whether an image can be used for diagnosis, comparative reference, general reference, etc.

On the one hand, as described above, image data groups are acquired at the display terminal for each examination or series; however, the examination or series can be input as image quality and/or usage purpose. That is to say, when said image data group is to be received, the input means is capable of receiving specification of said version as the image quality and/or usage purpose of the specific examination or series of an image data group. The storage control means assigns to each specific examination or series of said image data of each version one or more parameters representing the image quality and/or usage purpose thereof, and records said versions on aforementioned storage medium. The acquisition means acquires the version of image data corresponding to image quality and/or usage purpose of each desired examination or series received in the input means.

Although there are a variety of data-compression formats for image data, such as JPEG, GIF, TIFF, etc., in recent years, a format in which image data is broken down hierarchically into multiple resolution levels, and the data of each level is labeled and compressed has been proposed. More specifically, in this compression format data is broken down into multiple resolution levels by a wavelet transformation, and the data of each level derived thereby is labeled according to the order of the levels and stored in a file and compressed. Further, when reproducing image data compressed in this way, by expanding such compressed image data commencing in order from the hierarchical data having the lowest resolution level: first, all the images with the lowest resolution are displayed; and as the resolution level of each subsequent hierarchical data expanded becomes higher, the low-resolution image poor in image quality is reproduced so that it gradually becomes a more clear image. For example, for a case in which a high-resolution image represented by original image data S org having a resolution of 4,000×4,000 is hierarchically compressed according to the method described above, hierarchical data having resolutions of 125×125, 250×250, 500×500, 1,000×1,000, 2,000×2,000 and 4,000×4,000 is expanded in order and reproduced. This is called progressive expansion. In the present invention, the compression of image data hierarchically in this way is referred to as "progressively expandable" compression.

Therefore, in the image storage and display system of the present invention: that the storage control means, by subjecting aforementioned original image to progressively expandable compression, obtains aforementioned irreversible compressed image data; and that the acquisition means, for cases in which the version received in the input means corresponds to irreversible compressed image data, changes the level of progressive expansion, based on the predetermined conditions, and acquires said irreversible compressed image data is advantageous.

The expression "predetermined conditions" refers to the resolution level of the display terminal, processing capacity, the part examined, the examination method, the image size, etc.

The expression "changes the level of progressive expansion" refers to changing the final resolution level to which irreversible compressed image data is to be expanded. For example, in a case in which original image data having resolution of 4,000×4,000 and is hierarchically broken into 125×125, 250×250, 500×500, 1,000×1,000, 2,000×2,000, 4,000×4,000, based on said predetermined conditions, the image will not be restored to the 4,000×4,000 resolution level, but to 2,000×2,000, etc. intermediate resolution level. Note that changing the progressive expansion level can be preformed at the image server or the display terminal.

In addition, in the image storage and display system of the present invention: that the storage control means stores in aforementioned storage medium the original image data along with the diagnosis information of the original image data; and that the acquisition means acquires the version of image data or image data group along with said diagnosis information received at the input means is advantageous.

The expression "diagnosis information of the original image data" refers to reading notes, annotations a diagnostic report, etc. created by a doctor.

Also, it is advantageous that in the present invention the image server is provided with a diagnosis-status management means for managing the diagnosis status, and that the storage controller controls which version of image data is acquired at the display terminal, according to said diagnosis status.

The expression "diagnosis status" refers to the completion state of diagnosis. More specifically, pre-diagnosis, diagnosis complete, reading notes written, annotations attached, diagnostic report drafted, etc. indications as to the degree of completion of diagnosis.

Here, before original image data has been diagnosed, because no reading whatsoever has been performed, it is desirable to acquire original image data or reversible compressed image data capable of reproducing a high image-quality image. On the one hand, depending on the type of doctor, diagnostic, clinical, etc., the required image quality differs, and there are cases in which doctors want to avoid acquiring original image data or reversible compressed image data capable of reproducing a high image-quality image. Accordingly, the expression "controls which version of image data is acquired at the display terminal, according to said diagnosis status" means that corresponding to the diagnosis status, the version of image data acquired at the display terminal will differ. Therefore, depending on the diagnosis status, there are cases in which the version of image data requested by a display terminal will not be acquired.

In addition, it is advantageous that in the image storage and display system according to the present invention the image server is provided with an other storage medium in addition to aforementioned high readout-speed capable storage medium, and that the storage control means deletes the original image data and the reversible compressed image data from the high readout-speed capable storage medium after a predetermined period of time has elapsed, and stores in said other storage medium the original image data and the reversible compressed image data.

The expression "an other storage medium" refers to an optical disk, CD-R, DVD, DLT, etc long-term storage medium different from said high readout-speed capable storage medium.

Further, it is advantageous that in the image storage and display system according to the present invention the image server is provided with an other storage medium in addition to aforementioned high readout-speed capable storage medium, and that the storage control means stores in both the high readout-speed capable storage medium and the other storage medium all versions of image data, and deletes the original image data and the reversible compressed image data from the high readout-speed capable storage medium after a predetermined period of time has elapsed.

Still further, it is advantageous that in the image storage and display system according to the present invention the image server is provided with an other storage medium in addition to aforementioned high readout-speed capable storage medium, and that the storage control means stores in the high readout-speed capable storage medium all versions of image data, and in the other storage medium stores aforementioned irreversible compressed image data, and deletes the original image data and the reversible compressed image data from the high readout-speed capable storage medium after a predetermined period of time has elapsed.

In this way, images and image groups of a desired meeting a desired image quality and/or usage purpose, or images and images groups meeting the desired image quality and/or usage purpose of each examination or series can be displayed on the display terminal. Further, by classifying image data according to image quality and/or usage purpose, or by classifying image data groups according to the image quality and/or usage purpose of each by examination or each series, the acquiring of image data and image data groups is simplified, thereby benefiting the operator of the terminal.

Further, for cases in which irreversible compressed image data has been obtained by subjecting original image data to progressively expandable compression, by changing the progressive expansion level thereof, according to the predetermined conditions, unnecessary high resolution image data not required at the display terminal is not acquired, thereby proving for efficient acquisition of image data.

Still further, by storing in the storage medium the diagnosis information of the original image along with the image data, when image data and image data groups are acquired, the diagnosis information of the original image and the image data are acquired at the same time, and because the diagnostic information of the original image can be displayed, the diagnostic information for the image or image group can be easily assessed.

Further still, by controlling which version of image data is acquired at the display terminal, according to the diagnosis status, the reception of versions of the image data that are not requires at the display terminal can be prevented.

In addition, because the volume of original image data and reversible compressed image data is large, the amount of space consumed thereof on the storage medium is also large. Therefore, by deleting original image data and reversible compressed image data from the high readout-speed capable storage medium after a predetermined period of time has elapsed and storing said original image data and reversible compressed image data on aforementioned other storage medium, the amount of space consumed on the high readout-speed capable storage medium can be reduced.

Further, by storing in both the high readout-speed capable storage medium and the other storage medium all versions of image data, and deleting the original image data and the reversible compressed image data from the high readout-speed capable storage medium after a predetermined period of time has elapsed, or storing in the high readout-speed capable storage medium all versions of image data, and in the other storage medium storing aforementioned irreversible compressed image data, and deleting the original image data and the reversible compressed image data from the high readout-speed capable storage medium after a predetermined period of time has elapsed, the amount of space consumed on the high readout-speed capable storage medium can be reduced.

BRIEF DESCRIPTION OF THE DRAWINGS

FIG. 3 is a figure provided for explanation of the management of diagnosis status, FIG. 5 is a figure provided for explanation of the assigning of parameters representing image use and purpose.

DESCRIPTION OF THE PREFERRED EMBODIMENTS

Hereinafter, a preferred embodiment of the present invention will be explained with reference to the drawings.

Figure 1:
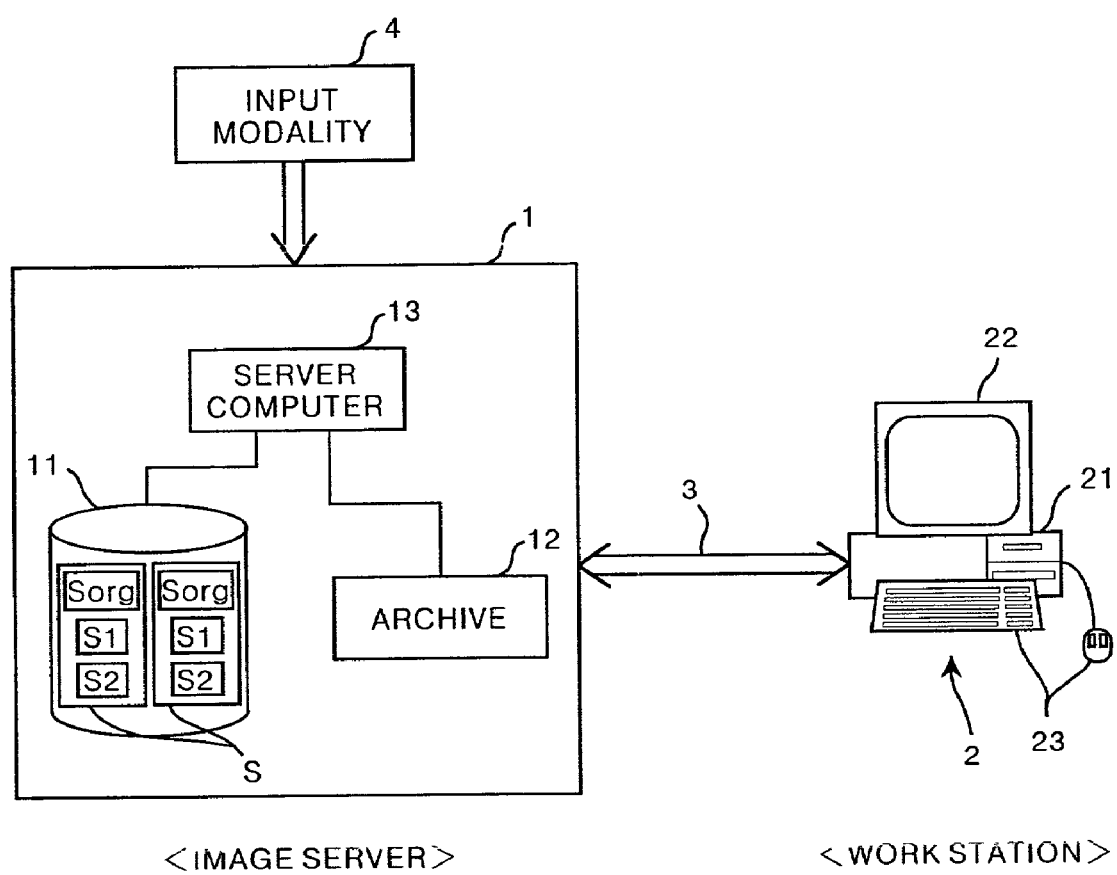
FIG. 1 is a schematic block diagram of a medical image network in which a preferred embodiment of the image storage and display system according to the present invention is implemented.

FIG. 1 is a schematic block diagram of a medical image network in which a preferred embodiment of the image storage and display system according to the present invention is implemented. As shown in FIG. 1, this medical image network comprises an image server 1 storing image data S, and a workstation 2 connected to image server 1 via a network 3. In such a medical image network, image data is acquired at workstation 2 by accessing image server 1 and specifying that image data stored in image server 1 be transmitted; images are displayed at workstation 2 and diagnosis can be performed. Note that in FIG. 1, although only one workstation is shown, multiple workstation 2's are connected to image server 1 by network 3.

Image server 1 is provided with: a temporary storage medium 11, such as a RAID (Redundant Array of Inexpensive Disks), etc. for temporarily storing image data S; an archive disk 12, such as a CD-R, DVD, DLI, etc. for providing semi-permanent storage of image data S after a specified period of time has elapsed; and a server computer 13 for controlling data-compression processing of image data S, data management, data transmission from workstation 2, and various operations and processes of image server 1. Further, image server 1 is connected to an input modality 4 such as CR apparatus, CT apparatus, MRI apparatus, etc., from which it receives formed image data S, which it stores and manages.

Note that temporary storage medium 11 is in a storage medium capable of high-speed readout, archive 12 is in another storage medium, and server computer 13 corresponds to the storage control means and diagnosis-status management means.

Workstation 2 is provided with: a computer 21; a CRT, LCD, etc. monitor 22; and a keyboard, mouse, etc. input means 23. By various input operations of input means 23, image data S can be acquired from image server 1 and images displayed on monitor 22.

More specifically, workstation 2 can acquire image data S by transmission thereof from image server 1. In addition, workstation 2 can acquire image data S by reading out from temporary storage medium 11 image data S stored therein. Note that acquired image data S can be stored in a storage medium of workstation 2 (a temporary buffer memory, a hard disk, etc.)

Note that normally, it is only possible to acquire at workstation 2 image data S stored in temporary storage medium 11 of image server 1. When image data S stored in archive 12 is required, it is necessary to issue a request to image server 1 and have image data S stored in archive copied to temporary storage medium 11.

Now, the method of storing image data S in image server 1 will be explained. Image data input to image server 1 from input modality 4 (hereinafter referred to as original image data S org) is compressed into irreversible compressed image data in server computer 13, and irreversible compressed image data S1 and S2, each having a different compression ratio are created. Here, irreversible compressed image data S1 is designated as having a compression ratio of 1/20, and irreversible compressed image data S2 a compression ratio of 1/50. Then, original image data S org, and created irreversible compressed image data S1 and S2 are stored in temporary storage medium 11. Note that by subjecting original image data S to a reversible data compression process, reversible compressed image data is created, and this can be stored in temporary storage medium 11 in place of original image data S. In addition, at the same time that image data S org, S1 and S2 are stored in temporary storage medium 11, original image data S org can be stored in archive 12.

Note that in the explanation provided below, original image data S org and irreversible compressed image data S1 and S2 will generically be referred to as image data S.

Further, when creating irreversible compressed image data S1 and S2, depending on the type of input modality 4, the part on which an examination was conducted, the examination method, the image size represented by original image data S org, etc., there are images for which degradation in image quality will not be strikingly noticeable even if the compression ratio is high.

Accordingly, depending on the input modality 4 by which original image data S org was obtained, the part on which an examination was conducted or the method of examination, the compression ratio of irreversible compressed image data can be changed. In this way, for original image data S org whose compression ratio can be raised, because it can be compressed at an extraordinarily high compression ratio, the amount of storage space consumed in temporary storage medium 11 can be reduced.

Here, irreversible compressed image data S1 and S2 having different compression ratios are created from stored original image data S org, and stored, along with original image data S org in temporary storage medium 11. In the current embodiment, these three types of image data are defined as different types of image data. That is to say, there are defined: original image data S org; a high image quality, high volume version V1 with a compression ratio of 1/20; a mid-range image quality, midrange volume version V2 with a compression ratio of 1/50; and a low image quality, low volume version V3. Note that for cases in which a reversible compressed image data S org is used in place of original image data S org, that the high image-quality, high-volume reversible compressed image data is version V1.

Figure 2:
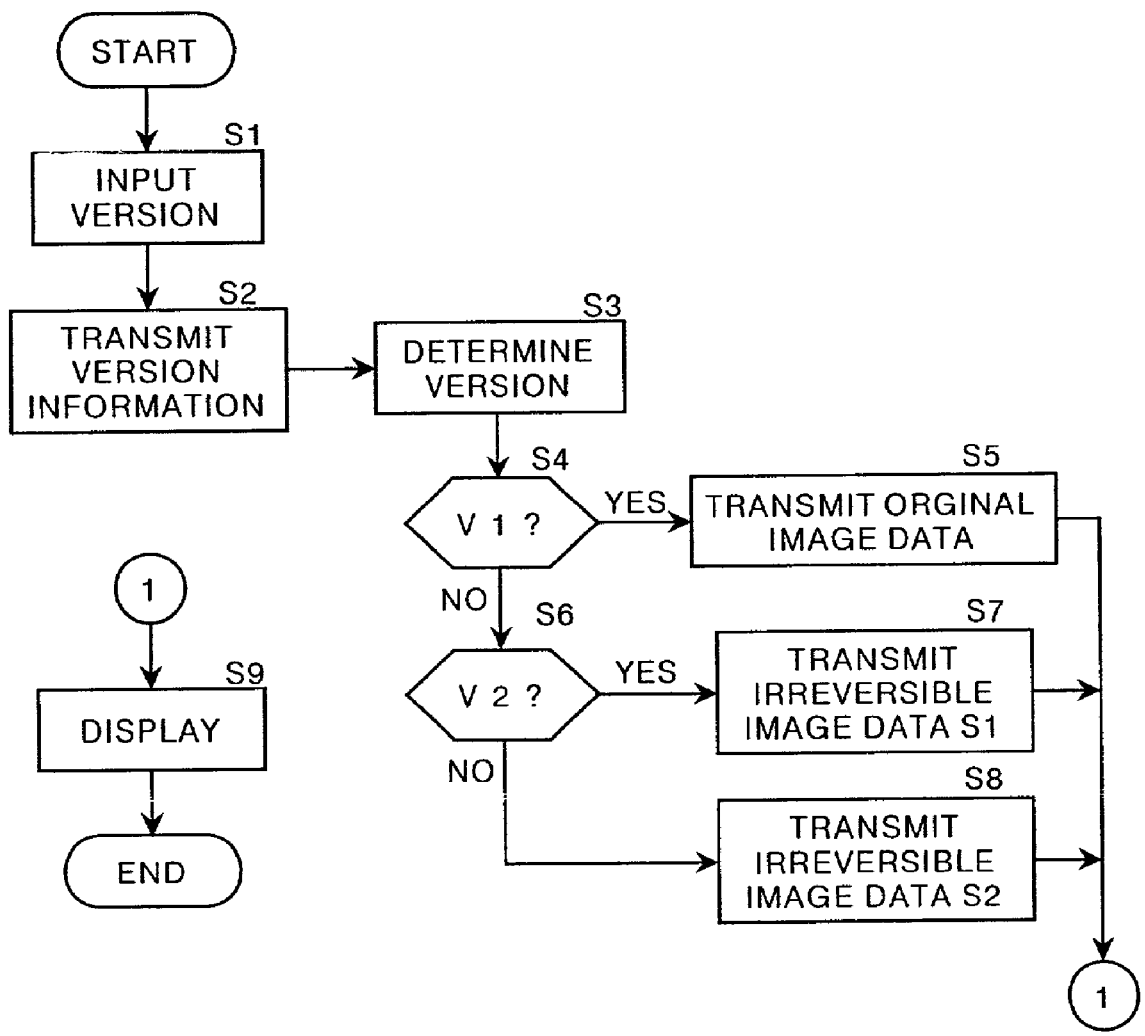
FIG. 2 is a flowchart showing the operation of the preferred embodiment.

Next, the operation of the current embodiment will be explained. FIG. 2 is a flowchart showing the operation of the current embodiment. First, the version of image data S acquired by input means 23 of workstation 2 is received (Step S1), and the version represented by the version information received via network 3 is transmitted to image server 1 (Step S2). When image server 1 receives transmission of the version information, an evaluation as to which image data S contained therein is to be transmitted to workstation 2 is performed (Step S3). For cases in which the version that should be transmitted is version V1, original image data S org corresponding to the version V1 that registers a yes in Step S4 is read out from temporary storage 11 and transmitted to workstation 2 (Step S3). For cases in which the version that should be transmitted is version V2, Step S4 registers a no, and irreversible compressed image data S1 that registers a yes in Step S6 is read out from the temporary storage medium and transmitted to workstation 2 (Step S7). For cases in which the version that should be transmitted is version V3, Step S6 registers a no, and the irreversible compressed image data S2 is transmitted to workstation 2 (Step S8). The image of the version transmitted to workstation 2 is displayed on monitor 22 (Step S9), and made available for diagnosis.

Note that when the workstation 2 at which images are read is a reading doctor's terminal, by the doctor specifying that version V1 be transmitted, original image data S org capable of reproducing a high image quality image appropriate for reading is transmitted to workstation 2. The doctor views the high image quality image appearing on display terminal 22, and can take notes and make annotation (explanatory notes), or draft a diagnostic report. On the other hand, when the workstation 2 at which images are to be viewed is a referring doctor's terminal used only for simple viewing of images, it is not necessary to reproduce images with a very high image quality. In addition, the monitor is not of as high a resolution as that of a reading doctor's terminal. In such cases, by a doctor specifying that version V2 or V3 be transmitted, irreversible compressed image data S2 or S3 is transmitted to workstation 2. Here, although compared to original image data S org the image quality of irreversible compressed image data S2 and S3 is inferior, because they are of a lower volume, the transmission time can be shortened.

In this way, because in the current embodiment original image data S org and irreversible compressed image data S1 and S2 are recorded in temporary storage medium 11, by only specifying at workstation 2 the version corresponding to these image data, transmission of the desired version of image data S can be received at workstation 2. Further, because these image data S are stored in temporary storage medium 11, which is capable of high-speed readout, transmission can be performed expediently. Accordingly, when past and present image data are to be compared, the necessity to copy the past image data recorded in a conventional type archive 12 to temporary storage medium 11 is eliminated, and efficiency of transmission of image data S is improved. In addition, because multiple versions of image data S are stored in temporary storage medium 11, the frequency with which pre-fetch operations must be performed is reduced.

For cases in which image data is to be transmitted from image server 1 over a communications circuit having a low data transmission rate, such as a telephone line, to a remote terminal (for example, a computer at a doctor's residence) for performing remote diagnosis, it is desirable that the volume of data be small. Because in the current embodiment low-volume irreversible compressed image data S1 and S2 are stored in the temporary storage medium 11, the necessity to create low-volume image data from conventional-type original image data S org when remote diagnosis is to be performed is eliminated; therefore, transmission of required low-volume image data can be performed expediently.

In addition, by storing original image data S org in archive 12, said original image data S org can be deleted from temporary storage medium 11 after a predetermined period of time has elapsed. Here, because the volume of original image data S org is larger than that of irreversible compressed image data S1 and S2, by deleting said image data S org from temporary storage medium 11, the amount of storage space consumed therein can be reduced. Further, because the volume of irreversible compressed image data S1 and S2 is extraordinarily low, an exceptionally large number of image data can be stored in temporary storage medium 11.

Here, the storing of original image data S org in archive 12 can be carried out after a predetermined period of time has elapsed. In this case, original image data S org can be deleted from temporary storage medium 11. Further, all versions of image data S can be stored on both temporary storage medium 11 and archive 12, and after a predetermined period of time has elapsed, original image data S can be deleted from temporary storage medium 11. Still further, storage of original data S org to archive 12 and deletion of temporary storage medium 11 can be managed by a database.

Note that in the current embodiment, after a doctor examining images has written the reading notes, annotations, or diagnostic report, that a record thereof is recorded in temporary storage medium 11 as diagnostic information related to the original image data is advantageous. In this way, when image data S is acquired at workstation 2, diagnostic information related to the original image data is also acquired at the same time, whereby both the image data S and diagnostic information related to the original image data are received at workstation 2 and made available for viewing.

Here, according to the completion-state of a diagnosis, the diagnostic status of image data recorded in temporary storage medium 11 can be managed. For example: Status 1 is designated so as to represent the diagnostic status for an image before diagnosis using said image is performed; Status 2, the diagnostic status for an image of which diagnosis has been completed; Status 3, the diagnostic status for an image of which diagnosis has been completed and reading notes composed; Status 4, adding to that described as Status 3 that annotations have been attached; Status 5, adding to that described as Status 4 that a diagnostic report has been drafted. By describing in the image-data header the information representing results classified by classifying diagnostic status in this way (for example, status 1, status 2, etc.), the status of image data can be managed. Therefore, as shown in FIG. 3, that the version of the same image data S to be transmitted can be controlled according to the status thereof is advantageous.

Figure 3:
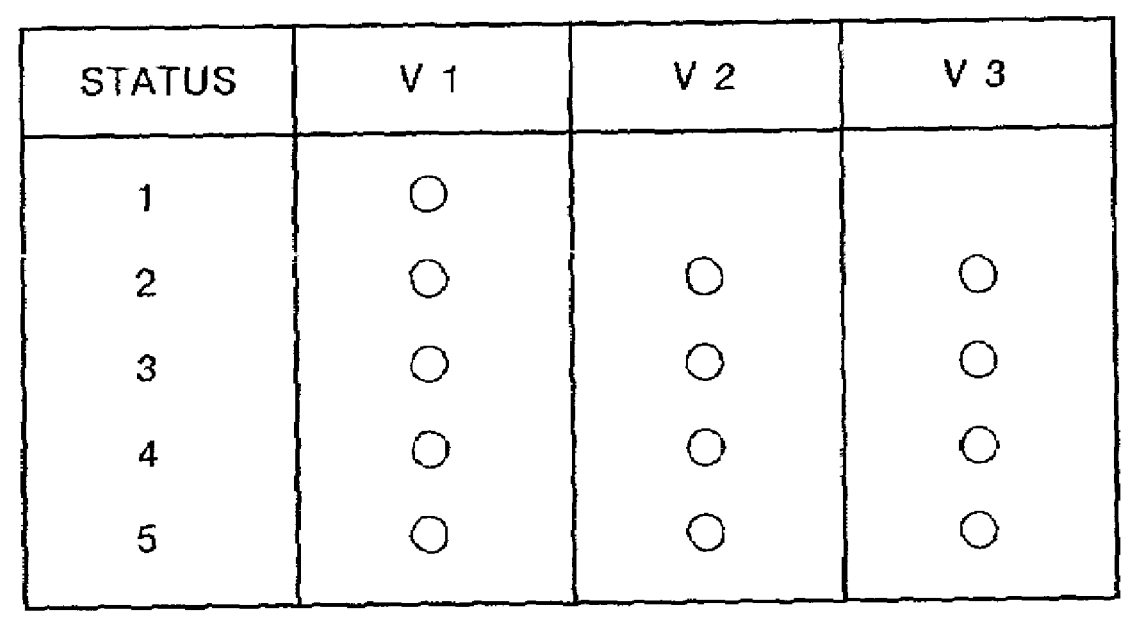

That is to say, as shown in FIG. 3, for an image of status 1, only version V1 can be transmitted (a 'O' represents transmittable), and for the other statuses 2–5, all versions can be made transmittable. Additionally, version V1 can be made transmittable for all statuses except for status 5. In this way, by controlling, according to the diagnostic status, the version of image data S to be transmitted, transmission of an image for which diagnosis has not been performed to a referring doctor's terminal, reception of an inappropriate version to workstation 2, etc. can be prevented.

Figure 4:
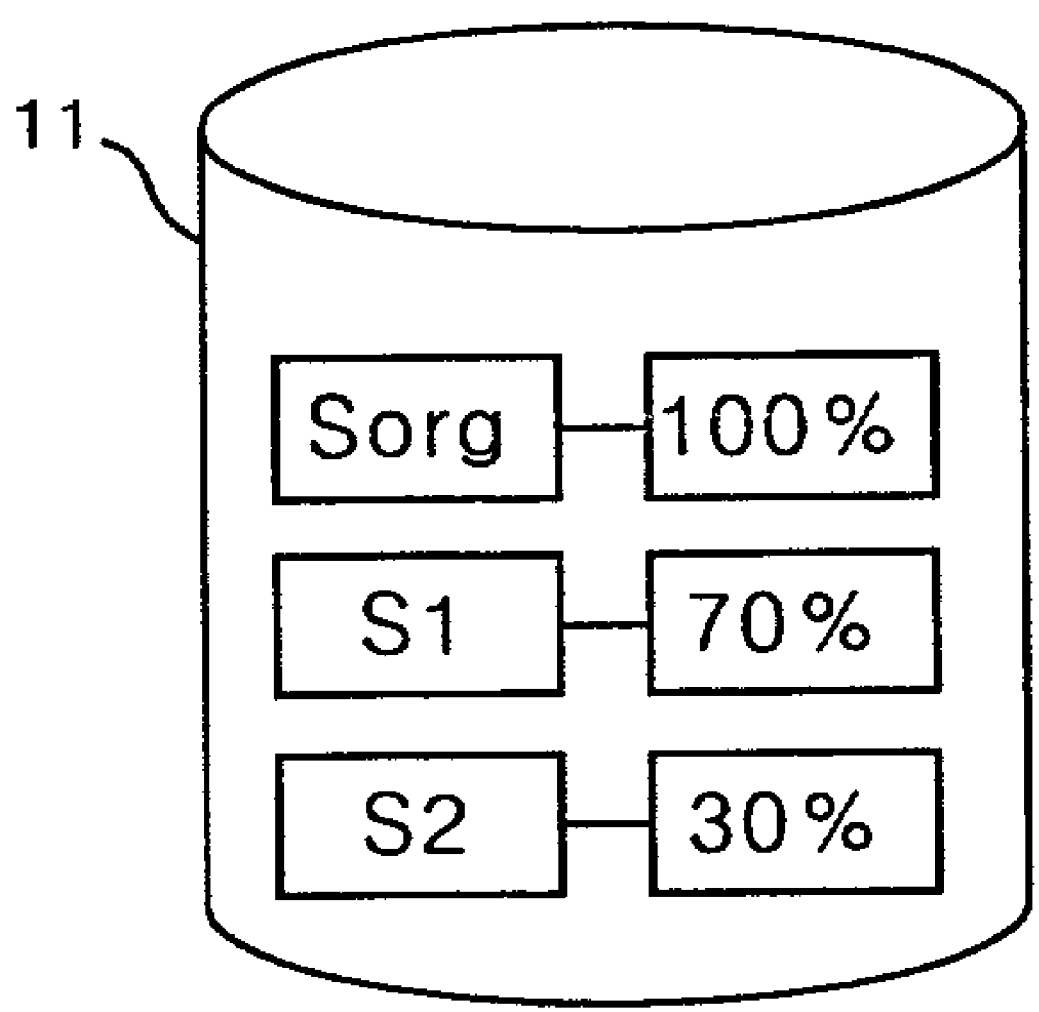
FIG. 4 is a figure provided for explanation of the assigning of parameters representing image quality.

Note that in the current embodiment, when storing image data S to the temporary storage medium, image quality parameters representing the image quality of original image data S org and irreversible compressed image data S1 and S2, respectively, can be attached thereto. FIG. 4 is a figure provided for explanation of the assigning of parameters representing image quality, which represents typical memory patterns recorded in temporary storage medium 11. Here, an image quality parameter represents the quality of an image represented by image data S, for example, for original image data S org, which has the highest image quality; a parameter of 100% is assigned. On the other hand, because the image quality of images represented by irreversible compressed image data S1, which has a compression ratio of 1/20, and S2, which has a compression ratio of 1/50, is inferior to that of original image data S org, a parameter according to the degree of degradation in image quality is assigned thereto.

Here, the relation between compression ratio and image quality varies according to the input modality 4 by which image data S is obtained. For example: a decompression ratio producing image quality of 50% compared to original image data is 1/20 if input modality 4 is a CR apparatus; 1/10 if input modality 4 is a CT apparatus; and 1/5 if input modality 4 is an MRI apparatus. In addition: a decompression ratio producing 25% image quality compared to original image data is 1/50 if input modality 4 is a CR apparatus; 1/20 if input modality 4 is a CT apparatus; and 1/10 if input modality 4 is an MRI apparatus. In the current embodiment, image data S is assumed to have been obtained by a CT apparatus, and because irreversible compressed image data S1 has a compression ratio of 1/20, and irreversible compressed image data S2 a compression ratio of 1/50, a parameter of 50% and 25%, respectively, are assigned thereto. Note that by describing the parameter in the header of original image data S org, and irreversible compressed image data S1 and S2, the parameter is thereby assigned.

In addition, when storing image data S to the temporary storage medium, parameters representing the usage purpose of original image data S org and irreversible compressed image data S1 and S2, respectively, can be assigned thereto. FIG. 5 is a figure provided for explanation of the assigning of parameters representing image use and purpose, in which typical memory patterns in temporary storage medium 11 are represented. Here, a usage purpose parameter represents the purpose for which an image represented by image data S is to be used, for example, if original image data S org is to be used in performing diagnosis; a parameter "diagnosis" is assigned. On the other hand, irreversible compressed image data S1 has a compression ratio of 1/20 and is to be used as a reference image, therefore, a parameter "reference" is assigned thereto. Additionally, irreversible compressed image data S2 has a compression ratio of 1/50 and is to be used as past image data for comparison purposes, therefore, a parameter "comparison" is assigned thereto. Note that by describing the parameter in the header of original image data S org, and irreversible compressed image data S1 and S2, the parameter is thereby assigned.

Note that both an image quality parameter and a usage purpose parameter may be assigned to image data S.

In this way, by assigning an image quality parameter and/or a usage purpose parameter, and by inputting the image quality and/or usage purpose from input means 23 of workstation 2, the image data S corresponding to said image quality and/or usage purpose can be transmitted to workstation 2, and image data S having the desired image quality and/or being appropriate for the purpose of use can be displayed on monitor 22. In addition, because the image quality and/or usage purpose can be input from workstation 2, compared to cases in which the version is specified, the type of image to be displayed on monitor 22 is made predictable, thereby benefiting the doctor utilizing workstation 2.

Figure 6A:
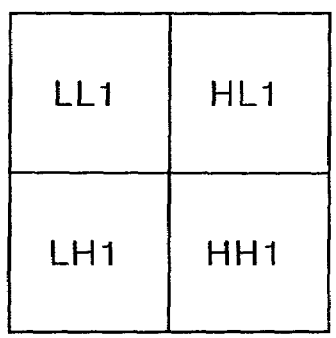
FIGS. 6A, 6B and 6C are provided for explanation of the data compression method for implementing progressively expanding compression of image data.
Figure 6B:
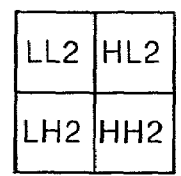
Figure 6C:
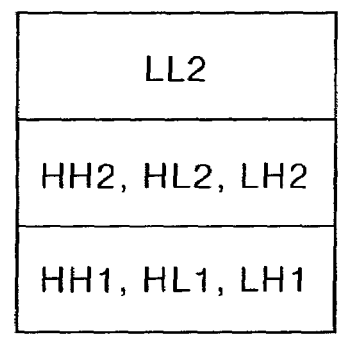

Note that image data S can be subjected to a data compression process so that it is progressively expandable, and aforementioned irreversible compressed image data S1 and S2 can be created in this way. FIGS. 6A, 6B and 6C are a provided for explanation of the data compression method for implementing progressively expanding compression of image data. First, as shown in FIG. 6A, original image data S is subjected to a wavelet transformation, and broken down into a plurality of 4 data: LL1, HL1, LH1 and HH1. Here, data LL1 represents an image whose length and width are reduced by ½, data HL1, LH1 and HH1 represent images having a lengthwise edge component, a widthwise edge component and a diagonal edge component, respectively. As shown in FIG. 6B, data LL1 is again subjected to a wavelet transformation, and 4 data: LL2, HL2, LH2 and HH2 obtained thereby. Here, data LL2 represents the image of data LL1 whose length and width are again reduced by ½, data HL2, LH2 and HH2 represent images having a lengthwise edge component, a widthwise edge component and a diagonal edge component, respectively. Therefore, data LL having a plurality of resolutions is obtained for each of the desired number of times data LL is subjected to the wavelet transformation. After which, as shown in FIG. 6C, data of each resolution level is labeled, said labeled data is saved in a file as hierarchical data, and this is designated as irreversible compressed image data.

By expanding such irreversible compressed image data commencing in order from the hierarchical data having the lowest resolution, first, all the images with the lowest resolution are displayed; the resolution level of the subsequent hierarchical data progressively expanded becomes higher, the low-resolution image poor in image quality is reproduced so that it gradually becomes a more clear image. For example, for a case in which a high-resolution image represented by original image data S org having a resolution of 4,000×4,000 is hierarchically compressed according to the method described above, hierarchical data having resolutions of 125×125, 250×250, 500×500, 1,000×1,000, 2,000×2,000 and 4,000×4,000 is progressively expanded in order and reproduced.

Therefore, for cases in which progressively expandable irreversible compressed image data S1 and S2 has been created, the level to which said image data is to be progressively expanded to can be set from input means 23 of workstation 2. For example, even for cases in which the image represented by original image data S org has a resolution of 4,000×4,000, if the resolution of the monitor of workstation 2 has a resolution of 2,000×2,000, even if said image data is progressively expanded to the highest resolution level, the image quality of the image displayed on monitor 22 does not change from that of the image data progressively decompressed to the 2,000×2,000 resolution. Accordingly, in such cases, by specifying the progressive expansion level, because transmission of image data not required at workstation 2 is thereby eliminated, the efficiency of transmission of image data S is thereby improved. Note that changing the progressive expansion level can be carried out at image server 1 or workstation 2.

Note that for cases in which progressively expandable irreversible compressed image data has been created, it is again possible to assign image quality and/or usage purpose parameters to thereto. In this case, according to the image quality, usage purpose and/or progressive expansion level, the appropriate version of irreversible compressed image data is acquired at workstation 2 and displayed.

Incidentally, it is possible for the version, image quality, usage purpose and or progressive expansion level to be specified by an examining doctor at workstation 2, however, for such cases, it is desirable that the settings be decided based on consideration of the various conditions listed below.

(1) Diagnosis status (unread, diagnostic report drafted, etc.)
(2) The data transmission rate of the network or communications circuit
(3) The memory size of computer 21
(4) The processing capacity of the CPU of computer 21
(5) The doctor using workstation 2, or the group of doctors said doctor belongs to
(6) The place the image will be used (a private residence, ICU, ER, a general hospital, a doctor's office, a diagnosis room, etc.)

In addition, it is possible to record the above conditions (1–5) on image server 1 in advance, so that it can be decided in image server 1 which version of image data S is to be transmitted to workstation 2 having a request for image data. Note that, although in the embodiment described above, irreversible compressed image data S1 and S2 having different compression ratios are created, it is also possible that only one irreversible compressed image data is created, or that three or more irreversible compressed image data are created.

In addition, although in the embodiment described above, only a single image data is acquired at workstation 2, in a single examination or series, normally, a plurality of image data is created and stored in image server 1. In this case, a plurality of image data (an image data group) can be obtained at image server 2 for each examination or series. For such cases, version input Step S1 of FIG. 2 can be performed for each examination or series. Further, for cases in which image quality parameters and/or usage purpose parameters have been assigned to image data S, the version of the data group to be acquired can be specified according to the image quality parameter and/or usage purpose parameter. For example, when diagnosis is performed using images obtained in an examination employing a CR apparatus, by input of the fact thereof from input means 23, the image data group version, among the image data groups obtained in said examination employing said CR apparatus, corresponding to the irreversible compressed image data S2 is acquired at workstation 2. In addition, for cases in which high image quality CR examination image data obtained for a given patient is required, by specifying the fact thereof from input means 23, the image data group version corresponding to original image data S org is acquired at workstation 2.

What is claimed is:

1. An image storage and display system comprising an image server storing image data recorded on a high readout-speed capable storage medium, and a display terminal connected to said image server via a network, wherein;

said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and said display terminal is provided with an input means capable of receiving specification of the a version of the image data or an image data group to be displayed on said display terminal, and an acquisition means for acquiring the version of said image data or said image data group received in said input means, wherein said storage control means obtains said irreversible compressed image data by subjecting said original image data to a progressively extractable data-compression process, and wherein said acquisition means, for cases in which the version received in said input means corresponds to irreversible compressed image data, changes the progressive expansion level of said irreversible compressed image data, according to the predetermined conditions, and acquires said irreversible compressed image data.

2. An image storage and display system according to claim 1, wherein:

said storage control means stores in said storage medium said multiple versions of image data along with a diagnostic information related to the original image data, and said acquisition means acquires the versions of image data or image data groups along with diagnosis information received in said input means.

3. An image storage and display system according to claim 2, wherein:

said display terminal displays the versions of image data or image data groups along with said diagnosis information acquired by said acquisition means.

4. The image storage and display system of claim 1, wherein the progressively extractable data-compression process comprises subjecting the original image data to a wavelet transformation.

5. The image storage and display system of claim 4, wherein the wavelet transformation produces an image whose length and width are reduced by ½, an image having a lengthwise edge component, an image having a widthwise edge component and an image having a diagonal edge component.

6. The image storage and display system of claim 1, wherein said storage control means is capable of changing a compression ratio of said irreversible compressed image data.

7. The image storage and display system of claim 6, wherein the progressively extractable data-compression process comprises subjecting the original image data to a wavelet transformation.

8. The image storage and display system of claim 7, wherein the wavelet transformation produces an image whose length and width are reduced by ½, an image having a lengthwise edge component, an image having a widthwise edge component and an image having a diagonal edge component.

9. An image storage and display system comprising an image server storing image data recorded on a high readout-speed capable storage medium, and a display terminal connected to said image server via a network, wherein;

said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and said display terminal is provided with an input means capable of receiving specification of the a version of the image data or an image data group to be displayed on said display terminal, and an acquisition means for acquiring the version of said image data or said image data group received in said input means, wherein said image server is provided with an other storage medium in addition to the high readout-speed capable storage medium, and wherein said storage control means deletes the original image data and the reversible compressed image data from the high readout-speed capable storage medium after a predetermined period of time has elapsed, and stores said original image data and said reversible compressed image data in said other storage medium.

10. The image storage and display system of claim 9, wherein said storage control means is capable of changing a compression ratio of said irreversible compressed image data.

11. An image storage and display system comprising an image server storing image data recorded on a high readout-speed capable storage medium, and a display terminal connected to said image server via a network, wherein;

said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and said display terminal is provided with an input means capable of receiving specification of the a version of the image data or an image data group to be displayed on said display terminal, and an acquisition means for acquiring the version of said image data or said image data group received in said input means, wherein said image server is provided with an other storage medium in addition to the high readout-speed capable storage medium, and wherein said storage control means stores all versions of image data in both said high readout-speed capable storage medium and said other storage medium, and deletes the original image data and the reversible compressed image data from said high readout-speed capable storage medium after a predetermined period of time has elapsed.

12. The image storage and display system of claim 11, wherein said storage control means is capable of changing a compression ratio of said irreversible compressed image data.

13. An image storage and display system comprising an image server storing image data recorded on a high readout-speed capable storage medium, and a display terminal connected to said image server via a network, wherein;

said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and said display terminal is provided with an input means capable of receiving specification of the a version of the image data or an image data group to be displayed on said display terminal, and an acquisition means for acquiring the version of said image data or said image data group received in said input means, wherein said image server is provided with an other storage medium in addition to the high readout-speed capable storage medium, and wherein said storage control means stores all versions of image data in said high readout-speed capable storage medium, stores said irreversible compressed image data in said other storage medium, and deletes said original image data or reversible compressed image data from said high readout-speed capable storage medium after a predetermined period of time has elapsed.

14. The image storage and display system of claim 13, wherein said storage control means is capable of changing a compression ratio of said irreversible compressed image data.

15. An image storage and display system comprising an image server storing image data recorded on a high readout-speed capable storage medium, and a display terminal connected to said image server via a network, wherein;
said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and
said display terminal is provided with an input means capable of receiving specification of a version of the image data or an image data group to be displayed on said display terminal, and an acquisition means for acquiring the version of said image data or said image data group received in said input means,
wherein said storage control means is capable of changing a compression ratio of said irreversible compressed image data,
wherein the server creates two irreversible compressed images, and
wherein the two irreversible compressed images are created using different compression ratios.

16. An image storage and display system comprising an image server storing image data recorded on a high readout-speed capable storage medium, and a display terminal connected to said image server via a network, wherein;
said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions and image data, and
said display terminal is provided with an input means capable of receiving specification of a version of the image data or an image data group to be displayed on said display terminal, and an acquisition means for acquiring the version of said image data or said image data group received in said input means,
wherein said storage control means is capable of changing a compression ratio of said irreversible compressed image data,
wherein a plurality of compression ratios are selectable by the storage control means based on a type of apparatus creating the original image data.

17. An image storage and display system comprising an image server storm image data recorded on a high readout-speed capable storage medium, and a display terminal connected to said image server via a network, wherein;
said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and
said display terminal is provided with an input means capable of receiving specification of a version of the image data or an image data group to be displayed on said display terminal, and an acquisition means for acquiring the version of said image data or said image data group received in said input means,
wherein said storage control means is capable of changing a compression ratio of said irreversible compressed image data,
wherein said storage control means assigns a parameter or parameters representing an image quality to each said version of said image data and stores each said version of said image data in said storage medium,
wherein said input means receives a parameter or parameters corresponding to a desired version of said image data from a user, and
wherein said acquisition means acquires said desired version of said image data from said image server and displays said desired version of said image data on said display terminal.

18. An image storage and display system comprising an image server storing image data recorded on a high readout-speed capable storage medium, and a display terminal connected to said image server via a network, wherein;
said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and
said display terminal is provided with an input means capable of receiving specification of a version of the image data or an image data group to be displayed on said display terminal, and an acquisition means for acquiring the version of said image data or said image data group received in said input means,
wherein said storage control means is capable of changing a compression ratio of said irreversible compressed image data,
wherein, for cases in which said image data group is to be acquired, said storage control means assigns a parameter or parameters representing an image quality to each version of image data corresponding to said image data group and stores each said version of said image data corresponding to said image data group in said storage medium,
wherein, for cases in which said image data group is to be acquired, said input means receives a parameter or parameters corresponding to a desired version of said image data of said image data group from a user, and
wherein, for cases in which said image data group is to be acquired, said acquisition means acquires said desired version of said image data of said image data group from said image server and displays the desired version of said image data of said image data group on said display terminal.

19. An image storage and display system comprising an image server storing image data recorded on a storage medium, and a display terminal connected to said image server via a network, wherein;

said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and said display terminal is provided with an input means capable of receiving specification of a version of the image data or an image data group to be displayed on said display terminal, and an acquisition means for acquiring the version of said image data or said image data group received in said input means, wherein said storage control means is capable of changing a compression ratio of said irreversible compressed image data, wherein said storage control means assigns a parameter or parameters representing an image quality to each said version of said image data and stores each said version of said image data in said storage medium.

wherein said input means receives a parameter or parameters corresponding to a desired version of said image data from a user, and wherein said acquisition means acquires said desired version of said image data from said image server and displays said desired version of said image data on said display terminal.

20. An image storage and display system comprising an image server storing image data recorded on a storage medium, and a display terminal connected to said image server via a network, wherein;

said image server is provided with a storage control means that creates reversible compressed image data of an original image data, and at least one irreversible compressed image data, and stores in said storage medium said original image data or said reversible compressed image data, and said at least one irreversible compressed image data, which stand for multiple versions of image data, and said display terminal is provided with an input means capable of receiving specification of a version of the image data or an image data group to be displayed on said display terminal, and an acquisition means for acquiring the version of said image data or said image data group received in said input means, wherein said storage control means is capable of changing a compression ratio of said irreversible compressed image data, wherein, for cases in which said image data group is to be acquired, said storage control means assigns a parameter or parameters representing an image quality to each version of image data corresponding to said image data group and stores each said version of said image data corresponding to said image data group in said storage medium, wherein, for cases in which said image data group is to be acquired, said input means receives a parameter or parameters corresponding to a desired version of said image data of said image data group from a user, and wherein, for cases in which said image data group is to be acquired, said acquisition means acquires said desired version of said image data of said image data group from said image server and displays said desired version of said image data of said image data group on said display terminal.

* * * * *